United States Patent
Klocek et al.

(10) Patent No.: US 6,778,722 B1
(45) Date of Patent: Aug. 17, 2004

(54) METHOD AND APPARATUS FOR SWITCHING OPTICAL SIGNALS WITH A PHOTON BAND GAP DEVICE

(75) Inventors: Paul Klocek, Dallas, TX (US); James M. Florence, Dallas, TX (US)

(73) Assignee: Raytheon Company, Lexington, MA (US)

( * ) Notice: Subject to any disclaimer, the term of this patent is extended or adjusted under 35 U.S.C. 154(b) by 99 days.

(21) Appl. No.: 09/844,170

(22) Filed: Apr. 25, 2001

(51) Int. Cl.[7] .............................................. G02B 6/26
(52) U.S. Cl. ........................... 385/16; 385/17; 385/19; 385/24
(58) Field of Search ..................... 385/16–24; 349/113, 349/159

(56) References Cited

U.S. PATENT DOCUMENTS

| | | | |
|---|---|---|---|
| 5,963,682 A | * | 10/1999 | Dorschner et al. ............. 385/16 |
| 6,101,300 A | | 8/2000 | Fan et al. |
| 6,278,105 B1 | | 8/2001 | Mattia |
| 6,310,991 B1 | | 10/2001 | Koops et al. |
| 6,430,334 B1 | * | 8/2002 | Ishikawa et al. .............. 385/18 |
| 6,456,416 B1 | | 9/2002 | Ichimura et al. |

FOREIGN PATENT DOCUMENTS

| | | |
|---|---|---|
| EP | 1 089 095 A2 | 4/2001 |
| WO | WO 98/53350 | 4/1998 |
| WO | WO 02/14913 A1 | 2/2002 |
| WO | WO 02/086615 A1 | 10/2002 |

OTHER PUBLICATIONS

Loncar, et al., "Waveguiding in planar photonic crystals", Applied Physics Letters, vol. 77, No. 13, Sep. 25, 2000, pp. 1937–1939.

Koops, "Photonic crystals built by three–dimensional additive lithography enable integrated optics of high density", SPIE, vol. 2849, pp. 248–156.

Joannopoulos, et al. "Photonic Crystals—Molding the Flow of Light", Princeton University Press, Princeton, New Jersey, title page, copyright page, pp. 100–104, 1995, No Month Available.

Chow, et al., "Three–dimensional control of light in a two–dimensional photonic crystal slab", Nature, vol. 407, Oct. 26, 2000, Macmillan Magazines Ltd., pp. 983–986.

Kerbage, et al., "Tunable devices based on dynamic positioning of micro–fluids in micro–structured optical fiber", Optics Communications, vol. 204, pp. 179–184, Apr. 1, 2002.

* cited by examiner

Primary Examiner—Hemang Sanghavi
(74) Attorney, Agent, or Firm—Baker Botts L.L.P.

(57) ABSTRACT

An optical switch (11, 111, 211) includes a member (26) having a plurality of openings (31–42) therethrough which are arranged in a periodic pattern. A path (86–87, 91–92, 96–97) extends through the member from an input to an output, with a subset of the openings disposed along the path. In one operational mode, each of the openings contains a material having an index of refraction which is different from the index of refraction of the member, so as to define a photon band gap configuration that inhibits propagation through the member of radiation at a predetermined wavelength. In a different operational mode, the index of refraction of the subset of openings along the path has a different value, which permits radiation to propagate along the path.

21 Claims, 5 Drawing Sheets

METHOD AND APPARATUS FOR SWITCHING OPTICAL SIGNALS WITH A PHOTON BAND GAP DEVICE

TECHNICAL FIELD OF THE INVENTION

This invention relates in general to communication with optical signals and, more particularly, to a method and apparatus for effecting switching of optical signals.

BACKGROUND OF THE INVENTION

Telecommunications is a field which has been rapidly evolving over the past twenty years, fueled in part by the progressively increasing popularity of technologies such as cellular telephones, facsimile machines, and computer communications that use the Internet. Due to these growing new technologies, there has been a progressively increasing demand for telecommunications equipment with greater information-carrying capacity, which in turn has created a progressively increasing focus on effecting communications through the use of optical signals.

High bandwidth fiber optic telecommunication systems are being deployed around the world. This is creating a backbone system which couples major metropolitan areas. Currently, when these existing systems need to effect switching of an optical signal, they typically convert the optical signal into an electrical signal, effect electrical switching of the electrical signal, and then convert the resulting electrical signal back into an optical signal. This greatly delays the propagation of information through the system, and is expensive because it increases the complexity of the system.

In order to avoid this problem, attempts are being made to develop optical switches which would directly switch optical signals, without temporarily converting them into electrical signals. Technologies which are being considered include micro-electro-opto-mechanical switches, bubble jets, liquid crystal arrays, moving opto-mechanical mirrors or prisms, electro-optic controlled coupled waveguides, and thermally controlled coupled waveguides. While these existing approaches have been generally satisfactory for their intended purposes, they have not been satisfactory in all respects. To some extent, these approaches involve problems such as poor reliability, high insertion or transmission losses, difficulty in scaling these switching approaches to larger sizes, and costly manufacturing techniques. Further, these existing approaches have relatively slow switching speeds, on the order of approximately a few milliseconds.

SUMMARY OF THE INVENTION

From the foregoing, it may be appreciated that a need has arisen for a method and apparatus for processing optical signals, which avoids at least some of the problems discussed above. According to the present invention, this need is addressed by the provision of a method and apparatus for operating an optical switch which includes an input for optical radiation, an output spaced from the input, and a first region disposed optically between the input and the output. The method and apparatus involve: providing within the first region a plurality of second regions and a third region, the second regions being provided at a spaced locations within the first region, and the third region having an index of refraction and being a portion of the first region other than the second regions; subdividing the second regions into first and second groups which are mutually exclusive, the second regions of the second group being arranged along a path which extends through the first region from the input to the output and which is free of the second regions of the first group; and selectively operating the switch in first and second operational modes, wherein in the first operational mode each of the second regions has an index of refraction different from the index of refraction of the third region so that the third region and the second regions cooperate to prevent optical radiation with a predetermined wavelength from propagating within the first region, and wherein in the second operational mode each of the second regions of the first group has an index of refraction different from the index of refraction of the third region so that the third region and the second regions of the first group cooperate to prevent radiation with the predetermined wavelength from propagating within portions of the first region other than along the path, and in which each of the second regions of the second group has an index of refraction selected in relation to the index of refraction of the third region so as to permit radiation with the predetermined wavelength to propagate through the first region along the path from the input toward the output.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
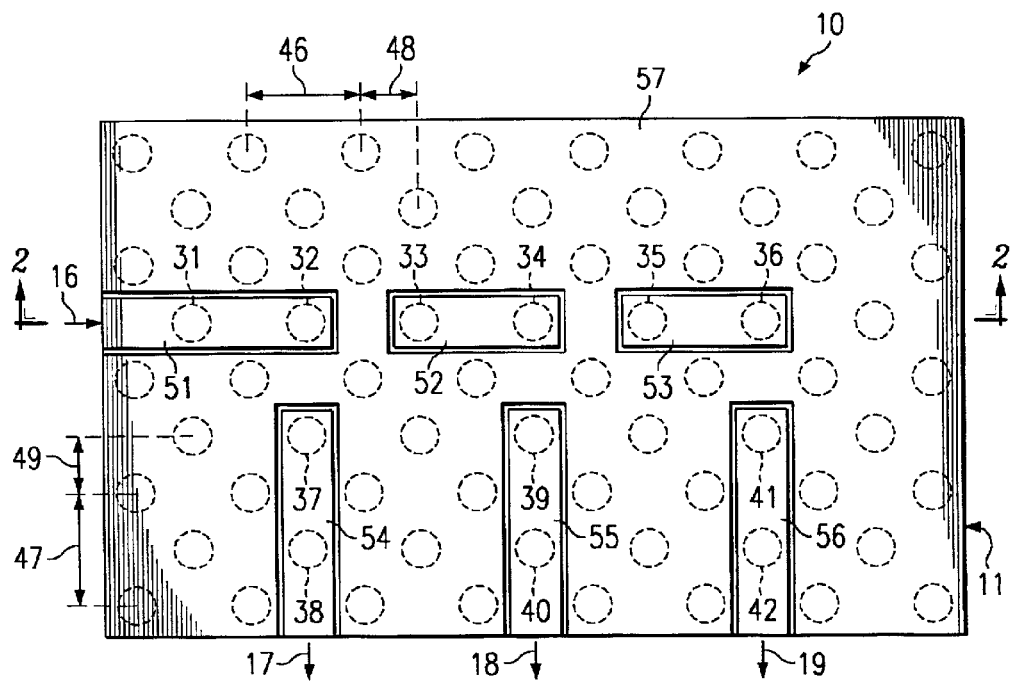
FIG. 1 is a diagrammatic top view of an optical switch which embodies the present invention.
Figure 2:
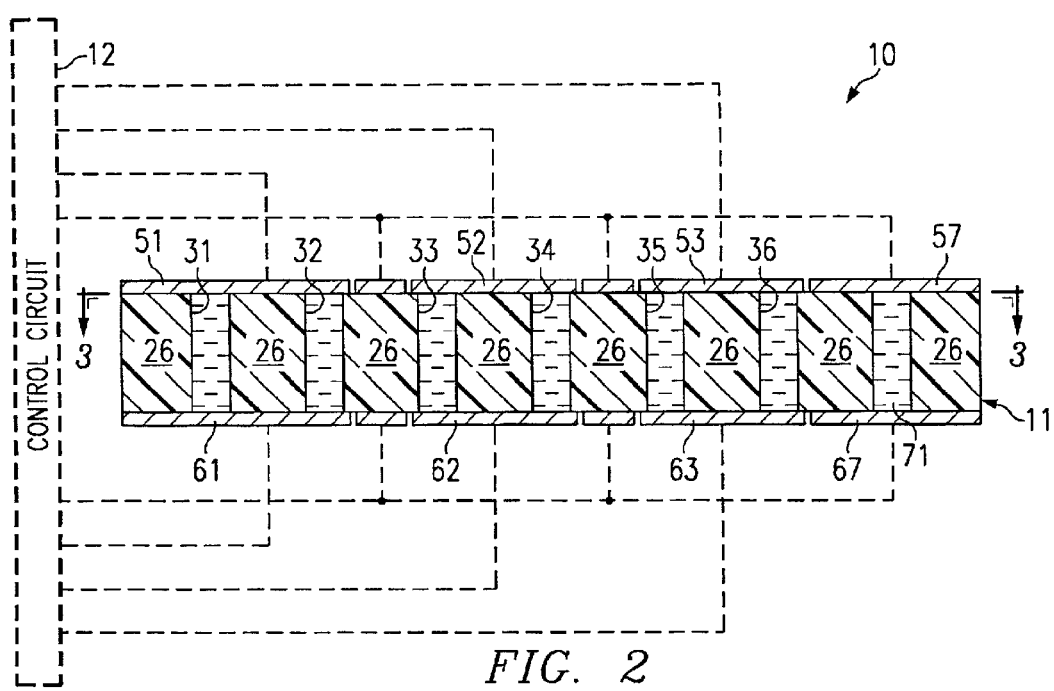
FIG. 2 is a diagrammatic sectional side view of the optical switch of FIG. 1, taken along the line 2—2 in FIG. 1, and also diagrammatically shows a control circuit for the optical switch.

FIG. 1 is a diagrammatic top view of an optical switch 11 which is part of an apparatus 10 that embodies the present invention. FIG. 2 is a diagrammatic sectional side view taken along the line 2—2 in FIG. 1, showing the optical switch 11, and also showing diagrammatically in broken lines a control circuit 12 which is a further part of the apparatus 10.

The optical switch 11 has one input and three outputs. In particular, with reference to FIG. 1, optical radiation can be supplied at 16 to an edge of the optical switch 11 which serves as an input, and this optical radiation can subsequently exit the optical switch 11 at any one of three locations that are disposed along another edge thereof, and that serve as respective optical outputs, as indicated diagrammatically by three arrows 17–19.

The embodiment of FIGS. 1–2 is configured for use with radiation having a wavelength of approximately 1.5 μm, which is a form of radiation commonly used for optical communication in the telecommunication industry. However, the present invention is suitable for use with radiation at a wide variety of other wavelengths. Further, the switch 11 of FIG. 1 is described herein for convenience as having a single input for the radiation 16, and three outputs corresponding to the radiation at 17–19. However, it will be recognized that the outputs could be inputs and that the input could serve as output. In fact, communications through the optical switch 11 could be bi-directional.

With reference to FIG. 2, the optical switch 11 includes a generally platelike member 26, which has planar top and bottom surfaces that are parallel. The member 26 has an approximately rectangular shape in a top view, corresponding to the outline of the switch 11 as seen in FIG. 1. The member 26 is made from fused silica glass, but could alternatively be made from single crystal silicon, chalcogenide glass, gallium arsenide, or some other suitable material. The material of the member 26 is inherently transmissive to radiation at the wavelength of interest, although there is other structure within the switch 11 which tends to control the extent to which radiation of interest is or is not permitted to propagate through the member 26, as discussed later.

A not-illustrated optical fiber carrying the input radiation 16 could be fused to the edge of the member 26 in a known manner, for example using the beam of a laser. Three additional optical fibers, which are also not illustrated, could be fused to respective locations along the edge of the member 26 in order to respectively receive the output radiation designated at 17–19.

The member 26 has a plurality of spaced cylindrical openings extending vertically through it, twelve of which are identified with reference numerals 31–42. The openings are arranged in a regular, periodic pattern, where the spacing 46 between adjacent openings in each row is the same as the spacing 47 between adjacent openings in each column. In the embodiments of FIGS. 1–2, the spacing at 46 and 47 is approximately 0.8 to 1.0 μm, and the openings each have a diameter of approximately 0.5 μm. The openings in each row have, with respect to openings in the adjacent rows, an offset 48 in the direction of the row. Similarly, the openings in each column have, with respect to the openings in adjacent columns, an offset 49 in the direction of the columns. The offsets 48 and 49 are the same, and are each half the value of the spacing at 46 or 47.

The openings in the member 26 can be formed in any convenient manner. One suitable technique is to pattern the top surface of the member 26 using photolithography, holography, laser writing, or electron beam writing, so as to define a plurality of circular regions arranged in the periodic offset pattern which is shown in FIG. 1. An etching process would then be carried out on the top surface of the member 26, in order to etch a respective opening therethrough where each circular region has been patterned.

Seven electrodes 51–57 are provided on the top surface of the member 26. In the disclosed embodiment, the electrodes 51–57 are each made from indium tin oxide (ITO), but there are other suitable materials from which the electrodes could alternatively be made. The electrode 51 covers the openings 31–32, the electrode 52 covers the openings 33–34, the electrode 53 covers the openings 35–36, the electrode 54 covers the openings 37–38, the electrode 55 covers the openings 39–40, and the electrode 56 covers the openings 41–42. The remaining electrode 57 covers all of the other openings in the member 26. Seven additional electrodes are provided on the bottom surface of the member 26, in a configuration which is a mirror image of the electrodes 51–57. Four of these additional electrodes are visible in FIG. 2, and are identified by reference numerals 61–63 and 67. Although the disclosed embodiment has seven separate electrodes on the bottom surface of the member 26, it would alternatively be possible to instead provide a single common electrode over substantially the entire bottom surface of the member 26, such that respective electrical voltages applied to the seven electrodes 51–57 on the top surface are all referenced to the single bottom electrode.

Each of the openings in the member 26 is filled with a liquid crystal material of a known type, for example as indicated at 71 in FIG. 2. The liquid crystal material is introduced into the openings before the electrodes are mounted on the member 26, for example by spinning or depositing the liquid crystal material onto the member 26. Although the disclosed embodiment uses a liquid crystal material, it would alternatively be possible to use some other electro-optically active material, such as chalcogenide glass, or other oxide crystals and polymers known to persons skilled in the art.

As is known in the art, a liquid crystal material will change its index of refraction, or dielectric constant, when an electric voltage is applied to it. The liquid crystal material 71 is transmissive to the radiation of interest. However, depending on its current index of refraction, the liquid crystal material and the material of member 26 may permit or prevent the propagation of radiation, as discussed in detail later.

The control circuit 12 is configured to be able to selectively apply a respective voltage between each pair of electrodes disposed on opposite sides of the member 26. For example, as shown diagrammatically by broken lines in FIG. 2, the control circuit 12 can selectively apply a voltage between the electrode pair which includes the electrodes 51 and 61. Similarly, the control circuit 12 can selectively apply a voltage between the electrode pair which includes the electrodes 52 and 62, a further voltage between the electrode pair which includes electrodes 53 and 63, and yet another voltage between the electrode pair which includes the electrodes 57 and 67. These voltages are used to control the state of the liquid crystal material within the openings through the member 26, which in turn has the effect of controlling the index of refraction of this liquid crystal material. In this regard, the optical switch 11 of FIGS. 1–2 has four distinct modes of operation, which are each discussed separately below.

More specifically, in a first operational mode, the voltages applied to the respective electrode pairs have values that cause the liquid crystal material in each of the openings to have an index of refraction which is different from the index of refraction of the material of the member 26, in a manner establishing photon band gaps throughout the switch 11. In this first operational mode, the periodic pattern of the openings in the member 26, in cooperation with the different indexes of refraction of the member 26 and the liquid crystal material, serve to create an optical configuration which is known as a photon band gap configuration. A photon band gap configuration is also sometimes referred to as a photonic crystal.

Figure 3:
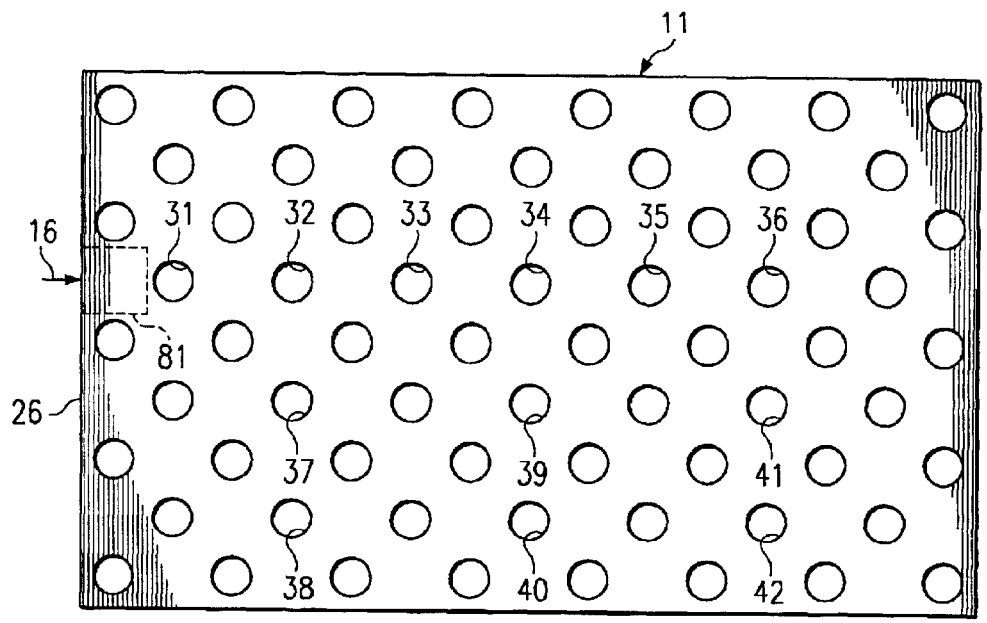
FIG. 3 is a diagrammatic sectional top view taken along the line 3—3 in FIG. 2, and shows a first operational mode of the optical switch.

In this regard, FIG. 3 is a diagrammatic sectional top view taken along the line 3—3 in FIG. 2, and is representative of the first operational mode. The openings in the member 26 are all shown in solid lines, to indicate that the liquid crystal material in these openings has an index of refraction which is different from the index of refraction of the material of member 26, in a manner establishing a photon band gap configuration. Optical radiation which is supplied at 16 to the input of the switch 11 will not be able to enter the member 26, or will be confined to a relatively small area in the region of the input, for example as indicated diagrammatically by broken lines at 81. In the disclosed embodiment, this operational mode occurs when the voltage applied by the control circuit 12 across each of the electrode pairs is zero volts, although it will be recognized that the switch 11 could be configured so that this first operational mode is established by the application of some other voltage between each electrode pair.

In a second operational mode of the switch 11, and with reference to FIG. 1, the control circuit 12 applies a positive voltage between the electrode pair which includes electrode 51 and also between the electrode pair which includes electrode 54 (FIG. 1). With reference to FIG. 1, this causes the liquid crystal material in the openings 31–32 and 37–38 to change to a state having a different index of refraction. In the disclosed embodiment, this index of refraction is the same as the index of refraction of the material 26, but it could be some other index of refraction. Consequently, the liquid crystal material in the openings 31–32 and 37–38 no longer cooperates with the material of the member 26 in a manner defining a photon band gap configuration in the region of openings 31–32 and 37–38. Thus, a path is established through the optical switch 11, where the openings 31–32 and 37–38 lie along this path.

Figure 4:
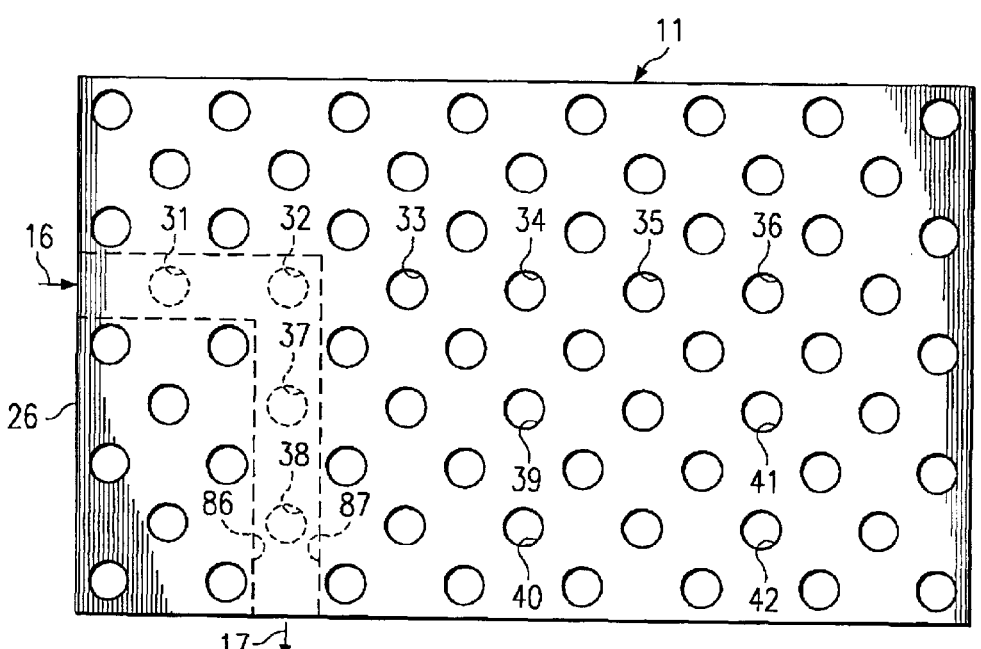
FIG. 4 is a diagrammatic sectional top view similar to FIG. 3, but showing a second operational mode of the optical switch.

In this regard, FIG. 4 is a diagrammatic sectional top view similar to FIG. 3, but showing this second operational mode. The openings 31–32 and 37–38 are shown in broken lines in FIG. 4, rather than in solid lines, in order to diagrammatically indicate that the portions of liquid crystal material in these openings now have the same index of refraction as the member 26, and thus appear to radiation as a part of the member 26. The above-mentioned path through the optical switch 11 is designated by a pair of L-shaped broken lines 86–87, the path being the region between these two broken lines. Optical radiation supplied at 16 to the input of the switch 11 will travel along this path, and will exit through the first output of the switch 11, as indicated by arrow 17. Although the radiation must effectively turn a right-angle corner in the region of opening 32, the nature of the photon band gap configuration disposed outside the path 86–87 forces the radiation to efficiently turn this corner with no perceptible loss. In fact, the path could be configured to include a corner which is more than 90°, and the radiation would efficiently turn this corner with no perceptible loss, due to the nature of the surrounding photon band gap configuration. Thus, the switch 11 is virtually lossless.

As discussed above, when an appropriate activating voltage is applied to the liquid crystal material in the disclosed embodiment, it changes to an index of refraction which is the same as the index of refraction of the material of member 26. However, it would be possible for the liquid crystal material to respond to an activating voltage by changing to an index of refraction which is different from the index of refraction of the material of member 26, so long as these two different indexes of refraction permit the propagation of radiation along the path, rather than creating a photon band gap configuration within the path.

In a third operational mode of the switch 11, and with reference to FIG. 1, a voltage of zero volts is applied to each electrode pair which includes one of the electrodes 53, 54, 56 and 57. A positive actuating voltage is applied to each of the electrode pairs which include one of the electrodes 51, 52 and 55. As a result, the liquid crystal material in each of the openings 31–34 and 39–40 assumes a state in which its index of refraction is the same as the index of refraction of the material of member 26.

Figure 5:
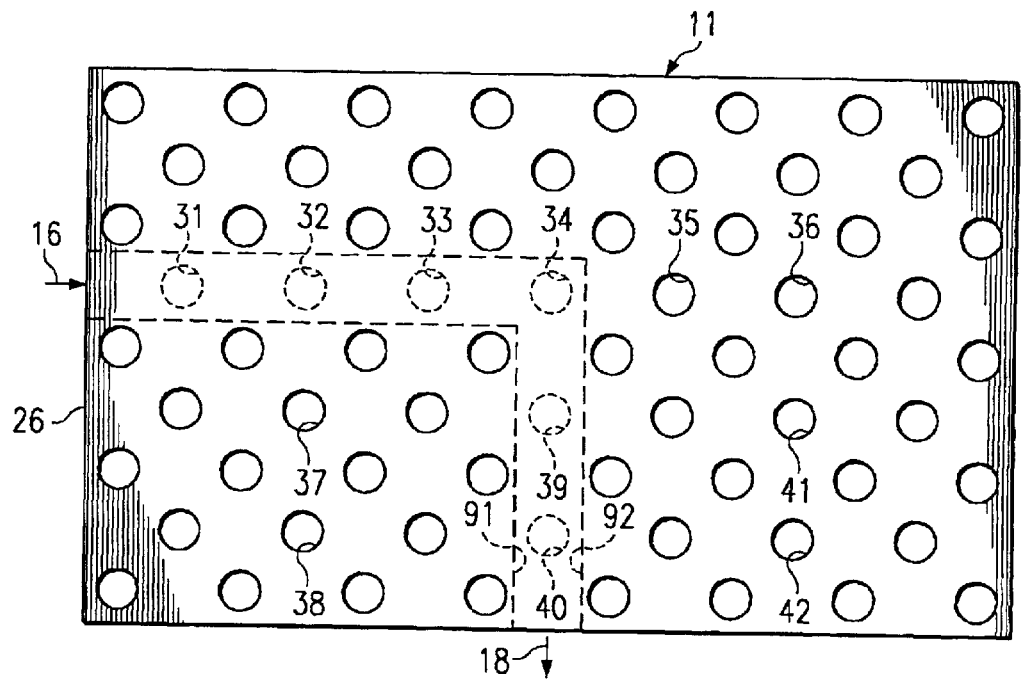
FIG. 5 is a diagrammatic sectional top view similar to FIGS. 3–4, but showing a third operational mode of the optical switch.

FIG. 5 is a diagrammatic sectional top view similar to FIGS. 3 and 4, but showing this third operational mode. A path from the input to the second output is indicated diagrammatically by two L-shaped broken lines 91 and 92, where the path lies between these lines, and where the openings 31–34 and 39–40 all lie along this path. Optical radiation supplied at 16 to the input of the switch 11 will travel along this path and exit the switch 11 at the second output, as indicated by arrow 18.

Figure 6:
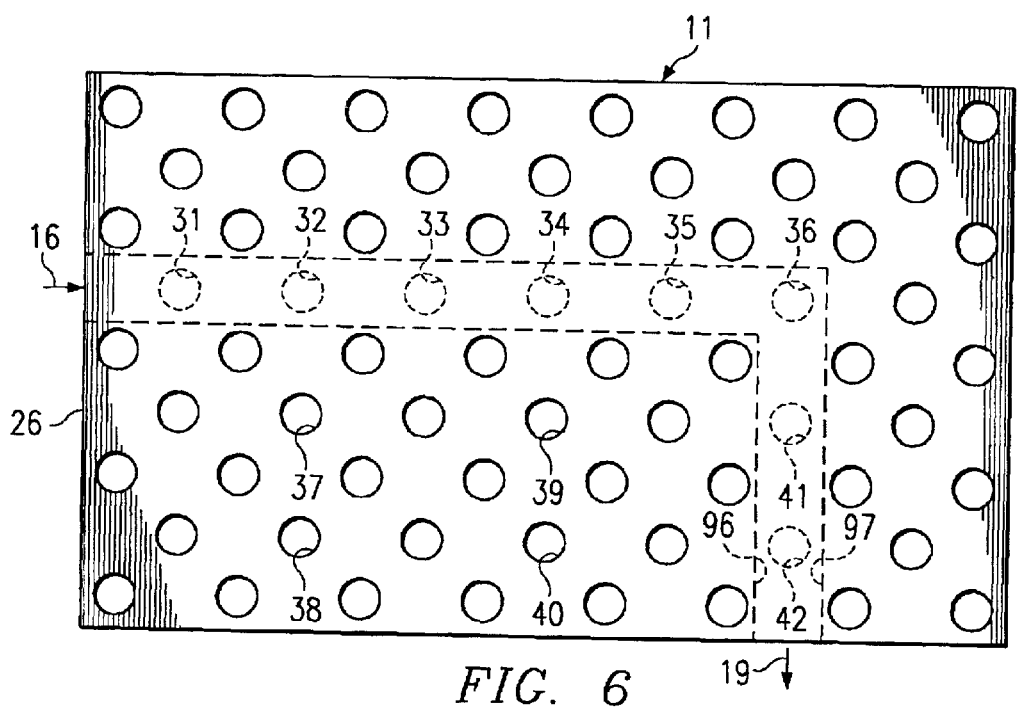
FIG. 6 is a diagrammatic sectional top view similar to FIGS. 3–5, but showing a fourth operational mode of the optical switch.

In a fourth operational mode of the switch 11, and with reference to FIG. 1, the control circuit 12 supplies a potential of zero volts to each of the electrode pairs which includes one of the electrodes 54, 55 and 57. A positive activating voltage is applied to each electrode pair which includes one of electrodes 51, 52, 53, and 56. This causes the liquid crystal material in each of the openings 31–36 and 41–42 to change to a state in which it has the same index of refraction as the material of member 26. FIG. 6 is a diagrammatic sectional top view similar to FIGS. 3–5, but showing this fourth operational mode. FIG. 6 includes two L-shaped broken lines 96 and 97, which delimit a path extending from the input to the third output, where the openings 31–36 and 41–42 all lie along this path. Optical radiation supplied at 16 to the input travels along this path, and exits the optical switch 11 at its third output, as indicated by arrow 19.

With reference to FIGS. 1–2, the openings in the member 26 which are associated with the pair of electrodes 51 and 61 have been described herein as containing a liquid crystal material, which is controlled by a voltage applied between the pair of electrodes 51 and 61. However, as evident from the foregoing discussion, the liquid crystal material in these openings has the same state and index of refraction in each of the four operational modes of the switch 11. Thus, it would be possible to omit the electrodes 51 and 61, and replace the liquid crystal material in the associated openings with a material which is not electrically controlled, and which has the non-varying index of refraction that is needed in these openings.

Figure 7:
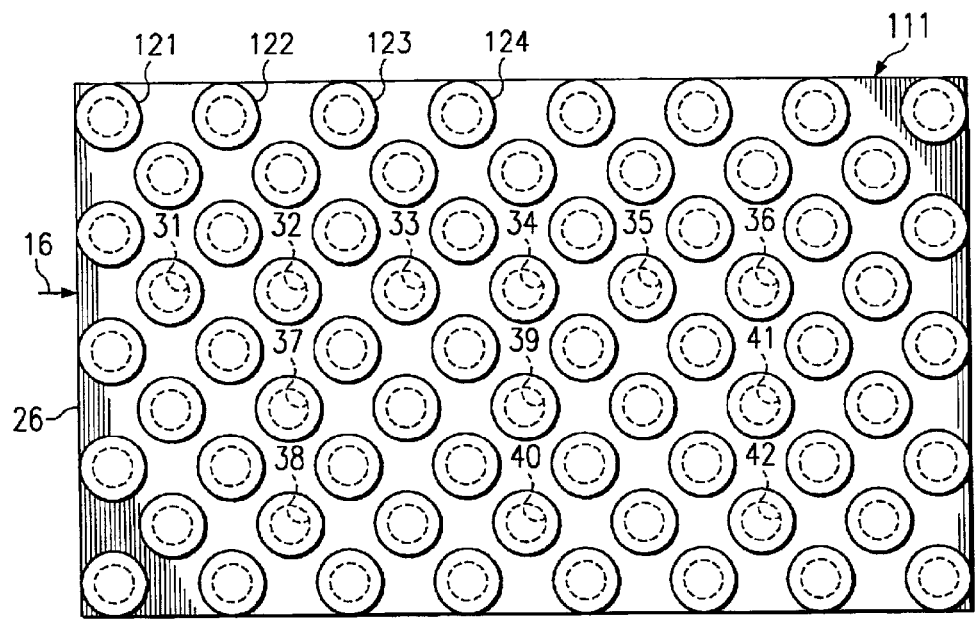
FIG. 7 is a diagrammatic top view of an optical switch which is an alternative embodiment of the optical switch of FIG. 1.

FIG. 7 is a diagrammatic top view similar to FIG. 1, but showing an optical switch 111 which is an alternative embodiment of the switch 11 of FIG. 1. Equivalent parts are designated with the same reference numerals. The primary difference is that the electrode configuration used for the switch 11 has been replaced with a different electrode configuration. In particular, a plurality of small circular electrodes are provided on the top surface of the member 26, four of these electrodes being identified by reference numerals 121–124. Each of the circular electrodes is associated with only one of the openings through the member 26. A plurality of further circular electrodes are provided in a similar manner on the bottom of the member 26. In the optical switch 111, the associated control circuit (which is not shown in FIG. 7) can control the liquid crystal material in each opening independently from the liquid crystal material in all other openings. Therefore, the control circuit has a wide degree of flexibility to route radiation through the switch 111 in any one of many different ways. The switch 111 thus permits a 1×N switch to be implemented in a relatively compact size for any practical value of N.

Figure 8:
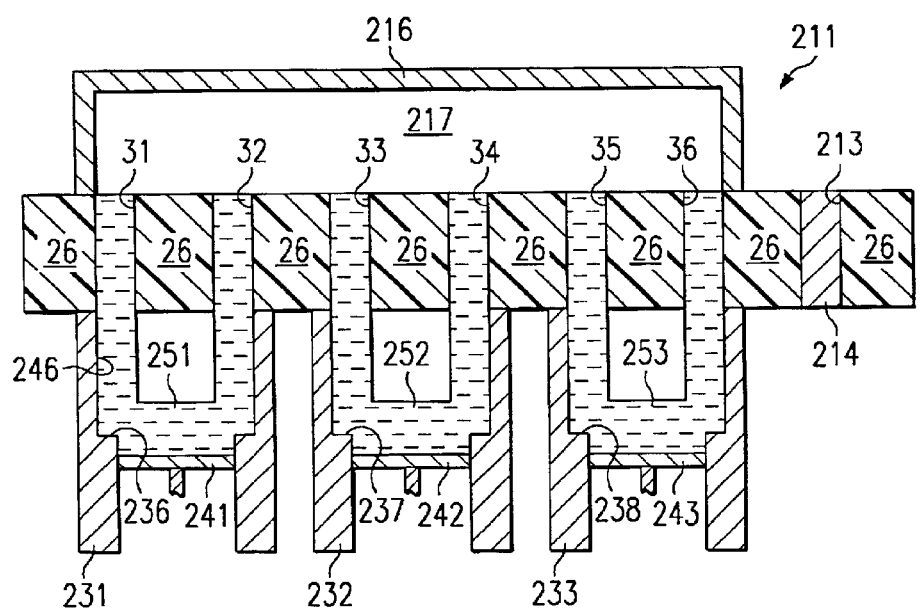
FIG. 8 is a diagrammatic sectional side view of an optical switch which is still another alternative embodiment of the optical switch of FIG. 1.

FIG. 8 is a diagrammatic sectional side view corresponding generally to FIG. 2, but showing an optical switch 211 which is an alternative embodiment of the optical switch 11 of FIGS. 1–2. The primary difference is that, in FIG. 8, changes to the refraction index of the material in the openings of the member 26 is effected mechanically or hydraulically, rather than by electrically controlling liquid crystals.

More specifically, the member 26 has an opening 213, which is one of the openings for which the index of refraction can be the same in all operational modes. Accordingly, this opening is filled with a solid material 214, which has an appropriate index of refraction different from the index of refraction of the member 26, so that these indexes of refraction cooperate to provide a photon band gap configuration in the region of the opening 213.

A housing 216 is mounted on the top of the member 26, and contains an air chamber 217 which is in fluid communication with each of the openings in the member 26 for which different indexes of refraction are used for different modes, including the openings 31–36. Three housings 231–233 are mounted on an underside of the member 26, and each have a respective chamber 236–238 therein. A respective piston 241–243 is movably supported in each of the housings 231–233, so to vary the size of the associated chamber 236–238 therein. The pistons 241–243 can be moved independently of each other by any suitable control mechanism. The openings 31 and 32 communicate with the chamber 236 through respective fluid passageways, one of which is indicated at 246. Similarly, the openings 33 and 34 communicate with the chamber 237 through respective fluid passageways, and the openings 35 and 36 communicate with the chamber 238 through respective fluid passageways. The chambers 236–238 each contain a quantity of a fluid 251–253, which is selected for its index of refraction.

As mentioned above, the pistons 241–243 can all be controlled independently. However, for purposes of convenience, they are all shown in a raised position in FIG. 8, in which the sizes of the chambers 236–238 have been effectively reduced in a manner which forces fluid up through the passageways and into the openings 31–36, while the air which was within these openings is forced up into the housing 216. The fluid moved into these openings has an index of refraction which is the same as the index of refraction of the material 26, so as to avoid a photon band gap configuration in the region of each of the openings 31–36. Consequently, radiation propagates through the member 26 along a path associated with these openings.

Figure 9:
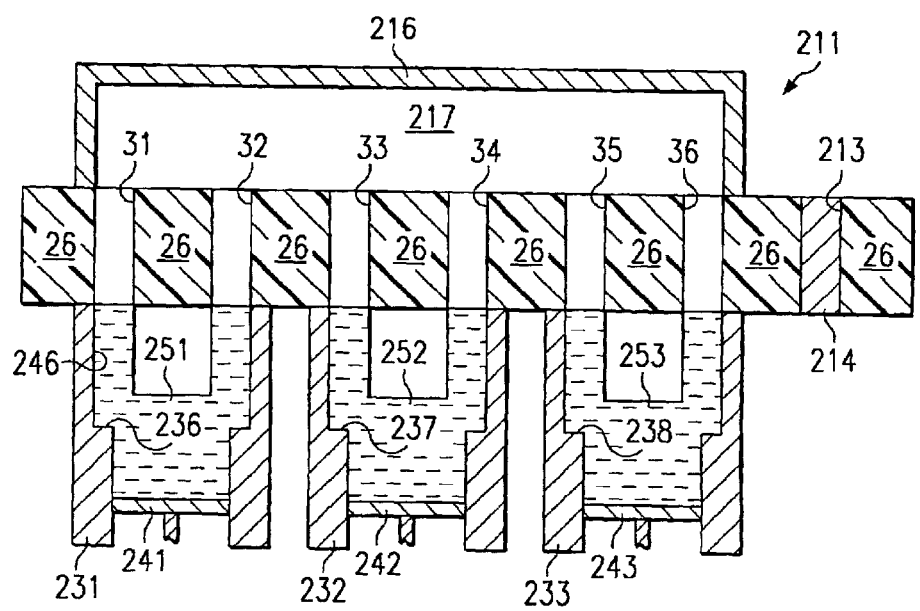
FIG. 9 is a diagrammatic sectional side view similar to FIG. 8, but showing a different operational mode of the optical switch of FIG. 8.

FIG. 9 shows a different operational mode of the switch 211, in which each of the pistons 241–243 has been moved downwardly, in order to enlarge the effective size of each of the chambers 236–238, which in turn causes the fluid to flow out of the openings 31–36, and to be replaced by air from the air chamber 217 in housing 216. This air has an index of refraction which is different from the index of refraction of the member 26, thereby creating a photon band gap configuration in the region of each of the openings 31–36, which prevents the propagation of radiation of interest in the region of these openings.

The present invention provides a number of technical advantages. Once such technical advantage is the capability to effect switching of an optical signal without converting the optical signal into an electrical signal, thereafter effecting the necessary switching using the electrical signal, and then converting the switched electrical signal back into an optical signal. As a result, optical switching can be effected rapidly and cheaply, and at very high data rates. A single stream of optical data can be efficiently divided up in real time, with respective segments being routed to different destinations.

Still another advantage is that the optical switch according to the invention has no significant insertion or transmission loss. It can be easily and cheaply manufactured in volume, has a high reliability, and can be easily scaled to fit various different applications. With respect to the embodiment in which the material in the opening is actually changed, an advantage is that the degree of change in the index of refraction can be greater than would be the case where the index of refraction of a single material is varied, for example under electrical control.

Although several selected embodiments have been illustrated and described in detail, it should be understood that various substitutions and alterations can be made therein without departing from the spirit and scope and of the present invention, as defined by the following claims.

What is claimed is:

1. An apparatus comprising an optical switch which includes:

an input for optical radiation;

an output spaced from said input; and a first region disposed optically between said input and said output, said first region including a plurality of second regions and a third region, said second regions being provided at spaced locations within said first region, and said third region having an index of refraction and being a portion of said first region other than said second regions;

said second regions including first and second groups of said second regions which are mutually exclusive, said second regions of said second group being arranged along a path which extends through said first region from said input to said output and which is free of said second regions of said first group;

said switch having a first operational mode in which each of said second regions has an index of refraction different from said index of refraction of said third region so that said third region and said second regions cooperate to prevent optical radiation with a predetermined wavelength from propagating within said first region;

said switch having a second operational mode in which each of said second regions of said first group has an index of refraction different from said index of refraction of said third region so that said third region and said second regions of said first group cooperate to prevent radiation with said predetermined wavelength from propagating within portions of said first region other than along said path, and in which each of said second regions of said second group has an index of refraction selected in relation to said index of refraction of said third region so as to permit radiation with said predetermined wavelength to propagate through said first region along said path from said input toward said output;

wherein each of said second regions of said second group has therein a portion of a material with different operational states in which said material has respective different indexes of refraction;

including structure for facilitating selective control of each said portion of said material so as to cause each said portion to be in a selected one of first and second states in which said portion respectively has first and second indexes of refraction when said switch is respectively in said first and second operational modes, said first and second indexes of refraction being different; and wherein said material is a liquid crystal material.

2. An apparatus according to claim 1, wherein said second regions are arranged within said first region in a periodic pattern so that said second and third regions together define a photon band gap arrangement in said first operational mode.

3. An apparatus comprising an optical switch which includes:

an input for optical radiation;

an output spaced from said input; and a first region disposed optically between said input and said output, said first region including a plurality of second regions and a third region, said second regions being provided at spaced locations within said first region, and said third region having an index of refraction and being a portion of said first region other than said second regions;

said second regions including first and second groups of said second regions which are mutually exclusive, said second regions of said second group being arranged along a path which extends through said first region from said input to said output and which is free of said second regions of said first group;

said switch having a first operational mode in which each of said second regions has an index of refraction different from said index of refraction of said third region so that said third region and said second regions cooperate to prevent optical radiation with a predetermined wavelength from propagating within said first region;

said switch having a second operational mode in which each of said second regions of said first group has an index of refraction different from said index of refraction of said third region so that said third region and said second regions of said first group cooperate to prevent radiation with said predetermined wavelength from propagating within portions of said first region other than along said path, and in which each of said second regions of said second group has an index of refraction selected in relation to said index of refraction of said third region so as to permit radiation with said predetermined wavelength to propagate through said first region along said path from said input toward said output;

wherein each of said second regions of said second group has therein a portion of a material with different operational states in which said material has respective different indexes of refraction, said material being a liquid crystal material;

including structure for facilitating selective control of each said portion of said material so as to cause each said portion to be in a selected one of first and second states in which said portion respectively has first and second indexes of refraction when said switch is respectively in said first and second operational modes, said first and second indexes of refraction being different;

wherein said switch includes a member which corresponds to said third region, which has said index of refraction, and which has therethrough a plurality of spaced and parallel openings that each correspond to a respective one of said second regions; and wherein a subset of said openings corresponds to said second group, and each of said openings in said subset has therein a respective said portion of said material.

4. An apparatus according to claim 3, wherein said structure includes first and second electrodes disposed on opposite sides of said member and each electrically coupled to each of said portions of liquid crystal material; and wherein said structure includes a circuit for selectively applying a voltage between said first and second electrodes.

5. An apparatus according to claim 3, wherein said second regions are arranged within said first region in a periodic pattern so that said second and third regions together define a photon band gap arrangement in said first operational mode.

6. An apparatus comprising an optical switch which includes:

an input for optical radiation;

an output spaced from said input; and a first region disposed optically between said input and said output, said first region including a plurality of second regions and a third region, said second regions being provided at spaced locations within said first region, and said third region having an index of refraction and being a portion of said first region other than said second regions;

said second regions including first and second groups of said second regions which are mutually exclusive, said second regions of said second group being arranged along a path which extends through said first region from said input to said output and which is free of said second regions of said first group;

said switch having a first operational mode in which each of said second regions has an index of refraction different from said index of refraction of said third region so that said third region and said second regions cooperate to prevent optical radiation with a predetermined wavelength from propagating within said first region;

said switch having a second operational mode in which each of said second regions of said first group has an index of refraction different from said index of refraction of said third region so that said third region and said second regions of said first group cooperate to prevent radiation with said predetermined wavelength from propagating within portions of said first region other than along said path, and in which each of said second regions of said second group has an index of refraction selected in relation to said index of refraction of said third region so as to permit radiation with said predetermined wavelength to propagate through said first region along said path from said input toward said output;

including a material having an index of refraction, said material being a liquid crystal material; and including structure for causing each of said second regions of said second group to have said material therein during one of said first and second operational modes, and to be free of said material during the other of said first and second operational modes.

7. An apparatus according to claim 6, wherein said switch includes a member which corresponds to said third region, which has said index of refraction, and which has therethrough a plurality of spaced and parallel openings that each correspond to a respective one of said second regions; and wherein said structure is operable to respectively supply said material to said openings corresponding to said second group for said one of said operational modes, and to withdraw said material from said openings corresponding to said second group for said other of said operational modes.

8. An apparatus according to claim 7, wherein said material is a fluid; and wherein said structure includes a fluid chamber with a variable size, and fluid passageways extending from said chamber to each of said openings corresponding to said second group, said chamber having said fluid therein.

9. An apparatus according to claim 8, wherein said openings have a further fluid therein during said other of said first and second operational modes.

10. An apparatus according to claim 9, wherein said further fluid is air.

11. An apparatus according to claim 6, wherein said second regions are arranged within said first region in a periodic pattern so that said second and third regions together define a photon band gap arrangement in said first operational mode.

12. An apparatus, comprising a switch which includes:

an input for optical radiation;

first and second outputs spaced from said optical input and from each other; and a first region disposed optically between said input and each of said outputs, said first region including a plurality of second regions and a third region, said second regions being provided at spaced locations within said first region, and said third region having an index of refraction and being a portion of said first region other than said second regions;

said second regions being arranged in first, second, third and fourth groups of said second regions which are mutually exclusive, said second regions of said second and third groups being arranged along a first path which extends through said first region from said input to said first output and which is free of said second regions of said first and fourth groups, and said second regions of said second and fourth groups being arranged along a second path which extends through said first region from said input to said second output and which is free of said second regions of said first and third groups;

said switch having a first operational mode in which each of said second regions has an index of refraction different from said index of refraction of said third region so that said third region and said second regions cooperate to prevent optical radiation with a predetermined wavelength from propagating within said first region;

said switch having a second operational mode in which each of said second regions of said first and fourth groups has an index of refraction different from said index of refraction of said third region so that said third region and said second regions of said first and fourth groups cooperate to prevent radiation with said predetermined wavelength from propagating within portions of said first region other than along said first path, and in which each of said second regions of said second and third groups has an index of refraction selected in relation to said index of refraction of said third region so as to permit radiation with said predetermined wavelength to propagate through said first region along said first path from said input toward said first output;

said switch having a third operational mode in which each of said second regions of said first and third groups has an index of refraction different from said index of refraction of said third region so that said third region and said second regions of said first and third groups cooperate to prevent radiation with said predetermined wavelength from propagating within portions of said first region other than along said second path, and in which each of said second regions of said second and fourth groups has an index of refraction selected in relation to said index of refraction of said third region so as to permit radiation with said predetermined wavelength to propagate through said first region along said second path from said input toward said second output;

wherein said switch includes a member which corresponds to said third region, which has said index of refraction, and which has therethrough a plurality of spaced and parallel openings that each correspond to a respective one of said second regions;

wherein a subset of said openings corresponds to said second, third and fourth groups, and each said opening in said subset has therein a respective portion of a liquid crystal material; and including structure for facilitating selective control of each said portion of said material so as to cause each said portion to be in a selected one of first and second states in which said portion has respective different indexes of refraction.

13. An apparatus according to claim 12, wherein said second regions are arranged within said first region in a periodic pattern so that said second and third regions together define a photon band gap arrangement in said first operational mode.

14. An apparatus according to claim 12, wherein said structure includes first, second and third electrodes disposed on one side of said member, and fourth, fifth and sixth electrodes disposed on the other side of said member, said first and fourth electrodes each being electrically coupled to each of said portions of liquid crystal material corresponding to said second group, said second and fifth electrodes each being electrically coupled to each of said portions of liquid crystal material corresponding to said third group, and said third and sixth electrodes each being electrically coupled to each of said portions of liquid crystal material corresponding to said fourth group; and wherein said structure includes a circuit for selectively applying a first voltage between said first and fourth second electrodes, a second voltage between said second and fifth electrodes, and a third voltage between said third and sixth electrodes.

15. An apparatus, comprising a switch which includes:

an input for optical radiation;

first and second outputs spaced from said optical input and from each other; and a first region disposed optically between said input and each of said outputs, said first region including a plurality of second regions and a third region, said second regions being provided at spaced locations within said first region, and said third region having an index of refraction and being a portion of said first region other than said second regions;

said second regions being arranged in first, second, third and fourth groups of said second regions which are mutually exclusive, said second regions of said second and third groups being arranged along a first path which extends through said first region from said input to said first output and which is free of said second regions of said first and fourth groups, and said second regions of said second and fourth groups being arranged along a second path which extends through said first region from said input to said second output and which is free of said second regions of said first and third groups;

said switch having a first operational mode in which each of said second regions has an index of refraction different from said index of refraction of said third region so that said third region and said second regions cooperate to prevent optical radiation with a predetermined wavelength from propagating within said first region;

said switch having a second operational mode in which each of said second regions of said first and fourth groups has an index of refraction different from said index of refraction of said third region so that said third region and said second regions of said first and fourth groups cooperate to prevent radiation with said predetermined wavelength from propagating within portions of said first region other than along said first path, and in which each of said second regions of said second and third groups has an index of refraction selected in relation to said index of refraction of said third region so as to permit radiation with said predetermined wavelength to propagate through said first region along said first path from said input toward said first output;

said switch having a third operational mode in which each of said second regions of said first and third groups has an index of refraction different from said index of refraction of said third region so that said third region and said second regions of said first and third groups cooperate to prevent radiation with said predetermined wavelength from propagating within portions of said first region other than along said second path, and in which each of said second regions of said second and fourth groups has an index of refraction selected in relation to said index of refraction of said third region so as to permit radiation with said predetermined wavelength to propagate through said first region along said second path from said input toward said second output;

including a material having an index of refraction, said material being a liquid crystal material; and including structure for causing each of said second regions of said second and third groups to have said material therein during one of said first and second operational modes, and to be free of said material during the other of said first and second operational modes, and for causing each of said second regions of said second and fourth groups to have said material therein during one of said first and third operational modes, and to be free of said material during the other of said first and third operational modes.

16. An apparatus according to claim 15, wherein said switch includes a member which corresponds to said third region, which has said index of refraction, and which has therethrough a plurality of spaced and parallel openings that each correspond to a respective one of said second regions;

wherein said structure is operable to respectively supply said material to said openings corresponding to said second and third groups for said one of said first and second operational modes, and to withdraw said material from said openings corresponding to said second group for said other of said first and second operational modes; and wherein said structure is operable to respectively supply said material to said openings corresponding to said second and fourth groups for said one of said first and third operational modes, and to withdraw said material from said openings corresponding to said second group for said other of said first and third operational modes.

17. An apparatus according to claim 15, wherein said second regions are arranged within said first region in a periodic pattern so that said second and third regions together define a photon band gap arrangement in said first operational mode.

18. A method of operating an optical switch which includes an input for optical radiation, an output spaced from said input, and a first region disposed optically between said input and said output, including the steps of:

providing within said first region a plurality of second regions and a third region, said second regions being provided at spaced locations within said first region, and said third region having an index of refraction and being a portion of said first region other than said second regions;

subdividing said second regions into first and second groups which are mutually exclusive, said second regions of said second group being arranged along a path which extends through said first region from said input to said output and which is free of said second regions of said first group;

selectively operating said switch in first and second operational modes, wherein in said first operational mode each of said second regions has an index of refraction different from said index of refraction of said third region so that said third region and said second regions cooperate to prevent optical radiation with a predetermined wavelength from propagating within said first region, and wherein in said second operational mode each of said second regions of said first group has an index of refraction different from said index of refraction of said third region so that said third region and said second regions of said first group cooperate to prevent radiation with said predetermined wavelength from propagating within portions of said first region other than along said path, and in which each of said second regions of said second group has an index of refraction selected in relation to said index of refraction of said third region so as to permit radiation with said predetermined wavelength to propagate through said first region along said path from said input toward said output;

providing within each of said second regions of said second group a portion of a material that has different operational states in which said material has respective different indexes of refraction;

effecting selective control of each said portion of said material so as to cause each said portion to be in a selected one of first and second states in which said portion respectively has first and second indexes of refraction when said switch is respectively in said first and second operational modes, said first and second indexes of refraction being different; and selecting a liquid crystal material for use as said portions of said material.

19. A method according to claim 18, including the step of arranging said second regions within said first region in a periodic pattern so that said second and third regions together define a photon band gap arrangement in said first operational mode.

20. A method of operating an optical switch which includes an input for optical radiation, an output spaced from said input, and a first region disposed optically between said input and said output, including the steps of:

providing within said first region a plurality of second regions and a third region, said second regions being provided at spaced locations within said first region, and said third region having an index of refraction and being a portion of said first region other than said second regions;

subdividing said second regions into first and second groups which are mutually exclusive, said second regions of said second group being arranged along a path which extends through said first region from said input to said output and which is free of said second regions of said first group;

selectively operating said switch in first and second operational modes, wherein in said first operational mode each of said second regions has an index of refraction different from said index of refraction of said third region so that said third region and said second regions cooperate to prevent optical radiation with a predetermined wavelength from propagating within said first region, and wherein in said second operational mode each of said second regions of said first group has an index of refraction different from said index of refraction of said third region so that said third region and said second regions of said first group cooperate to prevent radiation with said predetermined wavelength from propagating within portions of said first region other than along said path, and in which each of said second regions of said second group has an index of refraction selected in relation to said index of refraction of said third region so as to permit radiation with said predetermined wavelength to propagate through said first region along said path from said input toward said output;

providing a material having an index of refraction, said material being a liquid crystal material; and causing each of said second regions of said second group to have said material therein during one of said first and second operational modes, and to be free of said material during the other of said first and second operational modes.

21. A method according to claim 20, including the step of arranging said second regions within said first region in a periodic pattern so that said second and third regions together define a photon band gap arrangement in said first operational mode.

* * * * *